United States Patent
Okada et al.

(10) Patent No.: US 10,022,816 B2
(45) Date of Patent: Jul. 17, 2018

(54) FRICTION WELDING METHOD

(71) Applicant: NIPPON STEEL & SUMITOMO METAL CORPORATION, Tokyo (JP)

(72) Inventors: Tohru Okada, Tokyo (JP); Masanori Yasuyama, Tokyo (JP); Hitomi Nishibata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/906,446

(22) PCT Filed: Jul. 31, 2014

(86) PCT No.: PCT/JP2014/070240
§ 371 (c)(1),
(2) Date: Jan. 20, 2016

(87) PCT Pub. No.: WO2015/016319
PCT Pub. Date: Feb. 5, 2015

(65) Prior Publication Data
US 2016/0158878 A1 Jun. 9, 2016

(30) Foreign Application Priority Data
Aug. 1, 2013 (JP) .................................. 2013-160452

(51) Int. Cl.
*B23K 20/12* (2006.01)

(52) U.S. Cl.
CPC .................... *B23K 20/12* (2013.01)

(58) Field of Classification Search
CPC .... B23K 20/12; B23K 20/129; B23K 35/001; B23K 20/126; B23K 20/128; B23K 20/16
(Continued)

(56) References Cited

U.S. PATENT DOCUMENTS

| 3,134,278 A | 5/1964 | Hollander et al. |
| 3,234,645 A | 2/1966 | Hollander et al. |
(Continued)

FOREIGN PATENT DOCUMENTS

| CN | 103079744 A | 5/2013 |
| GB | 963694 A | 7/1964 |
(Continued)

OTHER PUBLICATIONS

JP10-180468A computer english translation Jul. 12, 2016.*
(Continued)

*Primary Examiner* — Erin Barry Saad
(74) *Attorney, Agent, or Firm* — Birch, Stewart, Kolasch & Birch, LLP

(57) ABSTRACT

The present invention is a friction welding method for friction welding of metal members characterized by starting friction welding in a state inserting an insert material between surfaces of the metal members facing each other, wherein the insert material consists of a metal having a melting point (centigrade temperature) of 60 to 80% of the melting point (centigrade temperature) of the metal members, melting the insert material, and pushing the melted insert material out from between the pair of metal members. Due to this, the adverse effects due to high temperature heating like in the past are eliminated while a quality of joint equal to or better than the past is obtained in a short time period.

18 Claims, 1 Drawing Sheet

(58) Field of Classification Search
USPC ..... 228/114.5, 113, 114, 112.1, 205, 2.3, 2.1
See application file for complete search history.

(56) References Cited

U.S. PATENT DOCUMENTS

| | | |
|---|---|---|
| 5,271,287 A | 12/1993 | Wadleigh |
| 5,314,106 A * | 5/1994 | Ambroziak .......... B23K 20/129 |
| | | 228/114 |
| 5,492,264 A | 2/1996 | Wadleigh |
| 2014/0030634 A1 | 1/2014 | Nanbu et al. |

FOREIGN PATENT DOCUMENTS

| | | |
|---|---|---|
| JP | 1-241375 A | 9/1989 |
| JP | 10-180468 A | 7/1998 |
| JP | 2006-159212 A | 6/2006 |
| JP | 2009-101374 A | 5/2009 |
| KR | 10-2009-0123902 A | 12/2009 |
| WO | WO 2008/120428 A1 | 10/2008 |

OTHER PUBLICATIONS

International Search Report, issued in PCT/JP2014/070240, dated Nov. 4, 2014.
Written Opinion of the International Searching Authority, issued in PCT/JP2014/070240, dated Nov. 4, 2014.

* cited by examiner (a)

(b)

(c)

FRICTION WELDING METHOD

TECHNICAL FIELD

The present invention relates to a friction welding method suitable for joining metal members with each other.

BACKGROUND ART

As one of the methods for joining metal members with each other, friction welding has been proposed. "Friction welding" is the method of bringing the joining surfaces of the metal members to be joined into contact with each other and applying pressure to the joining surfaces while mechanically making them move relative to each other to generate heat of friction and using this as the heat source for pressure welding. The relative motion of the members includes, for example, rotational motion about the axis vertical to the contacting surfaces, back and forth motion in a direction parallel to the contacting surfaces, etc. Friction welding does not utilize ohmic heating, so large power facilities are not required and relatively simple facilities can be used to obtain products with a high dimensional precision. Due to this, the method is applied for joining parts which have been subjected to finishing processes. Further, unlike general welding, different types of metal materials can also be joined, so the fields of application are broad. For this reason, this is being applied to valves for automobiles and other numerous precision machine parts etc.

Friction welding requires heating up to close to the melting point of the metal members and bonding by plastic flow near the joining surfaces. For this reason, deformation easily occurs near the joining surfaces. Further, the heat affected zone of the metal members becomes wider. That has a detrimental effect in terms of the strength and material characteristics. For this reason, various methods have been proposed as methods for controlling the heat affect of the metal members.

PLT 1 discloses a method of joining metal members with different heat capacities by friction welding during which inserting an insert material as a rotating member between the metal members, individually controlling the two members in temperature, and making the insert material rotate for frictional joining. In the friction welding method of PLT 1, the pair of metal members can be joined through the insert member.

PLT 2 proposes to lower the joining temperature by joining an amorphous alloy foil (solder material for soldering) used for liquid phase diffusion bonding to a metal member in advance by the friction welding method. That is, the primary joining of the friction welding can be performed at a temperature of the melting point of the soldering material (amorphous metal foil) or less and the secondary joining of the liquid phase diffusion bonding (soldering) can be performed at a temperature of the extent of the melting point of the soldering material (amorphous metal foil). For this reason, compared with the usual friction welding, the temperature can be lowered, so there is little deformation and the heat affected zone of the metal members can be made smaller. However, the method of PLT 2 basically joins metal members by liquid phase diffusion bonding, not friction welding.

CITATION LIST

Patent Literature

PLT 1. Japanese Patent Publication No. 2009-101374A
PLT 2. Japanese Patent Publication No. 2006-159212A

Non-Patent Literature

NPLT 1. Shinya Kyuso, *Research Concerning Friction Welding of Carbon Steel*, Apr. 1, 1976, Papers of the Japan Society of Mechanical Engineers (C Edition), pp. 1406 to 1414

SUMMARY OF INVENTION

Technical Problem

At the joining surfaces of the metal members to be joined, there are oxides (including natural oxide films—metal oxides due to the base material, below, simply called "oxides"). At the time of solid phase joining such as friction welding, it is important to remove the oxides from the joining surfaces. This is because if oxides remain at the joint interface, that part will form a defect and the joint strength will fall. Furthermore, this is because the oxides will become sources of formation of cracks. The oxides are also liable to cause remarkable degradation of the fracture toughness.

In normal friction welding, the vicinities of the joining surfaces soften because they become high in temperature. For this reason, at the time of pressure welding, the softened parts plastically flow. The parts are pushed out to the outside of the members together with the oxides. This forms burrs. Due to this plastic flow, the oxides are removed and clean metal surfaces closely bond to each other resulting in a defect-free joined member.

However, to push out the oxides, a sufficient amount of plastic flow has to be caused. For this reason, it is necessary to increase the amount of input heat and make the temperature as high as possible. The larger the metal members are made in size, the more the amounts which plastically flow increase, so the greater the amount of input heat becomes.

For example, in the case of steel, to secure a sufficient amount of plastic flow and raise the joint strength, the highest temperature becomes 1300 to 1400° C. (NPLT 1). The melting point of general low carbon steel is 1400° C. to 1500° C. or so, therefore this is learned to be extremely high. If heating to a high temperature in this way, it takes time to generate sufficient heat of friction and it is difficult to shorten the joining time.

Further, since the heating time becomes longer, heat conduction causes the heat affected zone of the metal members to become wider. The material characteristics of the heat affected zone change. For this reason, it becomes impossible to secure the designed strength and functions and other problems arise.

For example, when joining steel materials by friction welding, the vicinity of the joint rises in temperature over a broad range and a heat affected zone (below referred to as an "HAZ") is formed. The joint interface is heated once to the austenite region and after that it is rapidly cooled, so it forms a martensite structure and sometimes gives rise to remarkable HAZ hardening. In the case of hardened steel and other martensite steel, the steel is tempered in the region where the HAZ part is only heated to a temperature of less than the Ac1 point and so-called "HAZ softening" occurs. For this reason, in the case of hardened steel, a drop in strength occurs at part of the HAZ and the joined material as a whole is liable to fall in strength.

Furthermore, the region softened by high temperature is discharged to the outside because upset pressurization (pressing force) causes plastic flow. This forms burrs. In the case of a metal material, if the heating temperature of the joint is high, the softened region also becomes broader, so a broad range near the joint plastically flows. Not only does the amount of deformation become large, but also the amount of the burrs becomes greater. For this reason, the final product deteriorates in precision, deburring and other processing (cutting etc.) become necessary, and extra trouble and cost become required. This phenomenon is not limited to steel. In aluminum, titanium, copper, and other metal materials as well, a similar thing happens.

The present invention was made to solve such a problem. It has as its object to eliminate the adverse effects due to high temperature heating like in the past in friction welding of metal members while obtaining sufficient joint strength in a short time.

Solution to Problem

The present inventors engaged in intensive research and as a result obtained the following discoveries:
(a) They discovered that, in the friction welding method of metal members, when inserting an insert material with a lower melting point than the metal members between the metal members and then performing friction welding, it is possible to remove the oxides (oxide film) at the joining surfaces along with the flow of the melted insert material. Due to this, if the insert material melts, it is possible to remove the oxides (including oxide film) present at the joining surfaces of the metal members without heating the metal members more than necessary.
(b) They discovered that if just inserting, heating, and pressing an insert material, the oxides on the joining surfaces cannot be completely removed. That is, due to the relative motion of the joining surfaces (for example, rotational motion etc.), the oxides on the joining surfaces are peeled off or the oxides become more easy to peel off. In addition to this, due to the flow of the melted insert material, the peeling off oxides are scraped away and pushed out. Due to this, it is possible to remarkably raise the cleanliness of the joining surfaces and obtain a defect-free joint interface.
(c) They discovered that to obtain the above effects to the maximum extent, it is preferable to make the melting point of the insert material lower than the heating temperature required for joining (pressure welding temperature) by about 50° C. If the melting point of the insert material is unnecessarily low, before the oxides proceed to peel off much, the insert material ends up being pushed out to the outside.

By doing this, while the temperature is lower than with conventional friction welding, it is possible to press-weld clean joining surfaces from which the oxides have been removed, secure bondability of the metal members, and obtain a high joint strength. Furthermore, the heating temperature is low, so the joining time is shortened.

Further, metal materials fluctuate in melting point depending on their quality, so the inventors discovered that it is possible to approximately express the melting point of an insert material by the melting point of the metal members (centigrade temperature). That is, they discovered that the melting point of the insert material should be selected so as to become a temperature (centigrade temperature) of 60% to 80% of the melting point of the metal members.

The present invention was made based on these discoveries. It has as its gist the following:
(1) A friction welding method of a pair of metal members comprising the following steps;
starting the friction welding in a state inserting an insert material between surfaces of the metal members facing each other, wherein the insert material consists of a metal having a melting point (centigrade temperature) of 60 to 80% of the melting point (centigrade temperature) of the metal members, melting the insert material, and pushing the melted insert material out from between the pair of metal members.
(2) The friction welding method of metal members according to (1) wherein the insert material has a thickness of 10 to 500 μm.
(3) The friction welding method of metal members according to (1) or (2) wherein the insert material covers at least one of the joining surfaces.
(4) The friction welding method of metal members according to any one of (1) to (3) wherein the temperature at the time of pressure welding is higher than a melting point (centigrade) of the insert material by 50° C. or more.
(5) The friction welding method of metal members according to any one of (1) to (4) wherein the insert material does not remain between the metal members after friction welding.
(6) The friction welding method of metal members according to any one of (1) to (5) wherein the metal members are steel.

Advantageous Effects of Invention

According to the present invention, in friction welding of metal members, the adverse effects caused by high temperature heating like in the past is eliminated, joining is possible in a short time, and a joint strength equal to or greater than the past is obtained.

DESCRIPTION OF EMBODIMENTS

Below, a friction welding method according to the present invention will be explained. The friction welding method according to the present invention is a method of performing friction welding in the state inserting an insert material between a pair of metal members. Here, the surfaces of the pair of metal members which face each other and are joined will be called the "joining surfaces". Further, the pair of the metal members joined together will be called the "joined member". Further, the vicinity of the joint interface of the joined member will be called the "joint". Furthermore, in the present invention, a parameter related to temperature (for example, melting point etc.) shows the centigrade temperature (° C.) unless otherwise indicated.

Figure 1:
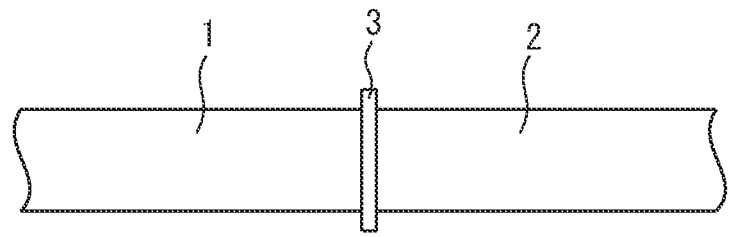
FIGS. 1(a) to 1(c) are views for explaining a friction welding method according to an embodiment of the present invention.
Figure 1:
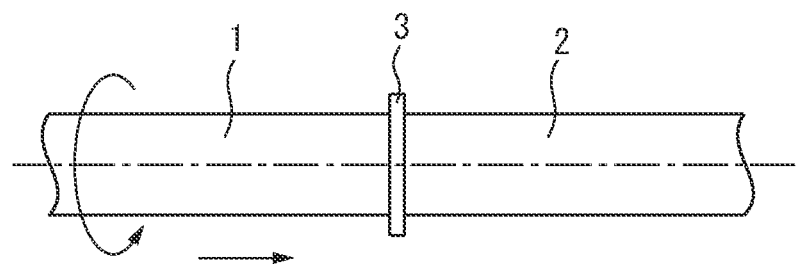
Figure 1:
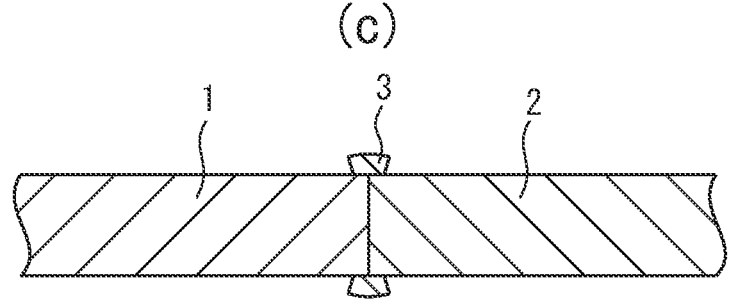

FIGS. 1(a) to 1(c) are views for explaining a friction welding method according to an embodiment of the present invention. Note that, in FIGS. 1(a) to 1(c), the case of joining columnar shaped metal members 1 and 2 is shown, but the friction welding method according to the present invention is not particularly limited to that shape. The method can also be applied to joining steel materials of other shapes (for example, cylindrical shapes and polygonal prism shapes).

As shown in FIG. 1(a), the metal members 1 and 2 are made to abut against each other in the state sandwiching between them a disk shaped insert material 3. The insert material 3 is comprised of a metal with a melting point of a centigrade temperature of 60% to 80% of the metal members 1 and 2. For example, when the metal members 1 and 2 are steel, it need only be a metal which has a melting point of about 900° C. to 1200° C. with respect to the melting point of steel (about 1500° C.). As the material of the insert material 3, a Cu, Fe, Ni, or Au-based alloy etc. may be mentioned. The thickness of the insert material 3 is, for example, preferably 10 to 500 μm. The insert material preferably covers the joining surface of at least one of the metal members.

In the present embodiment, the metal member 1 is held at a rotary holding part (not shown) of a friction welding apparatus (not shown), while the metal member 2 is fastened to a fastening part (not shown) of the friction welding apparatus (not shown). The metal member 1 is lightly pushed through the insert material 3 against the metal member 2 to establish a state where the insert material 3 is clamped between the metal members 1 and 2. At this time, from the viewpoint of the workability, the insert material 3 may also be attached to the joining surface of the fixed metal member 2 by an adhesive etc. In this state, the friction welding is started.

Note that, the friction welding method of the present invention can be worked using a known friction welding apparatus or an apparatus comprised of a known friction welding apparatus with some simple design changes, so a detailed explanation of the friction welding apparatus will be omitted.

Next, as shown in FIG. 1(b), in the present embodiment, the metal member 1 is made to rotate at a high speed while making it move in the axial direction to thereby press it against the steel material 2 through the insert material 3. The insert material 3 is held by receiving pressure from the metal members 1 and 2 while rotating relative to the two members. Due to this, heat of friction is generated at both the contact parts of the steel material 1 and insert material 3 and the contact parts of the steel material 2 and insert material 3. Due to this heat of friction, the insert material 3 is heated and melted. Note that, the speed and pressing force of the metal member 1 are determined based on the dimensions and materials of the steel materials 1 and 2 and insert material 3, the type of the friction welding apparatus, etc. For example, when the metal members are steel, these should be suitably set in the ranges of a rotational speed of 1000 to 4000 rpm and a pressing force of 30 to 300 MPa. Further, the present embodiment makes only the metal member 1 rotate, but the two members may also be made to rotate. In this case, making the metal members 1 and 2 rotate oppositely is preferable to increase the relative speed. Of course, the relative motion is not limited to rotation. Straight back and forth motion etc. are also possible. The mode of motion is not limited so long as a type of motion at which heat of friction is generated.

Next, as shown in FIG. 1(c), the metal members 1 and 2 are further pressed together, whereby the melted insert material 3 is pushed out from between the metal members 1 and 2 and the metal member 1 and the metal member 2 are made to directly contact each other to join them. At this time, the oxides at the joining surfaces of the metal members 1 and 2 peel off and are discharged to the outside along with the melted insert material.

Normally, there are oxides at the joining surfaces of the metal members. For example, when the metal members are steel, $Fe_2O_3$ and oxides of Si and Mn in the steel constituted by $SiO_2$ and MnO are present on the joining surfaces. When the metal members are aluminum, there is $Al_2O_3$ (so-called "alumina") present on the joining surfaces. These oxides peel off from the metal members due to the high temperature and rotational force (force due to relative motion) or become easy to peel off. There, the melted insert material flows so as to be pushed out to the outside by the pressing action, so the oxides on the joining surfaces are also pushed out to the outside as if being flushed away.

In this way, the insert material and the joining surfaces high in cleanliness with no impurities such as oxides contact each other, so a good joined member high in joint strength can be obtained. The temperature of the joint at this time is higher than the melting point of the insert material by about 50° C., so the temperature is lower than the temperature in conventional friction welding, but the temperature is a temperature sufficient for obtaining bondability. After that, the insert material 3 discharged from the joining surfaces is removed and the joined member comprised of the metal members 1 and 2 is completed. While the temperature is lower than that of conventional friction welding, it is possible to obtain a joined member with no defects and with a high joint strength.

In the prior art, the plastic flow of the metal members themselves was used to discharge the oxides to the outside, but plastic flow of a considerable amount of the metal members was necessary. However, in the present invention, the discharge of the oxides is left to the melted insert material, so there is no flow of the metal members themselves or even if there is, is relatively small in amount. For this reason, it is possible to suppress deformation of the metal members and raise the precision of finish of the obtained joined member.

Further, due to this, it is possible to prevent broad ranges of the metal members 1 and 2 from becoming high in temperature, so the HAZ can be kept from forming over a broad range around the joint. As a result, the HAZ softened region is also reduced and a drop in strength of the joined member can be suppressed.

Insert Material

The insert material according to the present invention will be explained with reference to the case where the metal members are steel.

Melting Point of Melting Insert Material

In the case of steel, at a joining surface temperature of about 1000° C., it is known that the bonding becomes easier and the bonding strength (joint strength) is improved (NPLT 1). The temperature required for this pressure welding is referred to here as the "pressure welding temperature". It is learned that the pressure welding temperature is correlated with the melting point. In research of the inventors, it was confirmed that with S15C steel (melting point: about 1500° C.), sufficient joining is possible at an insert material melting point of 900° C. and pressure welding temperature of 950° C. That is, the melting point of the insert material is 60% of the melting point of steel and the pressure welding temperature is 63%. Note that, the pressure welding temperature was measured by burying a thermocouple near the joint interface at the center part of the joint at the fixed chuck side. On the other hand, in conventional friction welding, the heating temperature of the joining faces reaches 1300 to 1400° C. (NPLT 1). That is, about 90% of the melting point of steel is reached. In the conventional method, it is learned how high the temperature was.

As in the problem of the present invention, if the heating temperature becomes too high at the time of friction welding, the HAZ becomes broader and a drop in strength and other adverse effects arise. Therefore, the heating temperature at the joining surfaces has to be made lower than the conventional heating temperature, so the temperature is preferably made less than 1300° C. By doing this, the heating time can be shortened, the HAZ width can be kept down, and the adverse effects due to the higher temperature can be eliminated.

As a result of research of the inventors, it was discovered that the melting point of the insert material is preferably 900° C. to 1200° C. and the heating temperature of the joining surfaces (pressure welding temperature) should be made higher than the melting point of the insert material by about 50° C.

In general, steel and other metals change in melting point depending on the compositions of components. If the melting point becomes lower, the pressure welding temperature also becomes lower and the highest heating temperature of the joining surfaces also has to be made lower. As explained above, the pressure welding temperature is correlated with the melting point to a certain extent. This is deemed approximately as a proportional relationship. Therefore, in the present invention, the melting point of the insert material is shown by a ratio with respect to the melting point of the metal member. In the case of the above S15C steel, the melting point is about 1500° C. The melting point of the insert material should be set to 60% to 80% of the melting point of the metal members becoming the base materials. Further, the joining surface temperature (pressure welding temperature) at the time of the pressure welding operation should be set so as to become higher than the melting point of the insert material by about 50° C. If ordinary steel, good pressure welding is possible if in this range.

Further, for example, in the case of high carbon steel (C: 2%), the melting point becomes 1150° C. or so. By the melting point being made lower in temperature, the pressure welding temperature also becomes lower in temperature. In this case as well, it is possible to use an insert material having a melting point of 700° C. corresponding to 60% of the melting point of the steel forming the base material and join by friction welding at a pressure welding temperature of 750° C.

If considering that the joinability is improved if the joining temperature is a high temperature, the pressure welding temperature is preferably more than 70° C. of the melting point of the insert material, more preferably more than 80° C. The upper limit of the pressure welding temperature is not particularly set, but even at the highest, is about 90% of the melting point of the metal members in the same way as the past.

The material of the insert material is not particularly limited, but can be obtained from a Cu-, Fe-, Ni-, Au-based alloy etc. by adjusting the melting point. For example, a soldering material etc. can be used. For example, a Ni-3.5% Si-8% B-11% V alloy (melting point: 1073° C.), Fe-2.5% Si-12% B-8% V alloy (melting point: 1122° C.), and Ni-0.8% Si-15% P-7% V alloy (melting point: 942° C.) are known (all PLT 2).

Thickness of Insert Material

The insert material also softens and plastically flows by being pressed if heated to its melting point or so. Therefore, if the insert material becomes too thin in thickness, the joining surfaces of the metal members may end up contacting each other and the insert material may disappear between the joining surfaces before reaching the melting point of the insert material. For this reason, the thickness of the insert material should be made 10 µm or more. From the viewpoint of handling ability, manufacturability, etc., it is preferably 25 µm or more, more preferably 50 µm or more.

On the other hand, if the insert material becomes too thick, the heating time of the insert material becomes longer and further the time period required for discharge of the insert material between the joining surfaces increases. Due to this, the amount of heat conducted to the metal members may increase and as a result the HAZ may become wider. For this reason, the thickness of the insert material should be made 500 µm or less. The effect of reducing the thickness on shortening of the heating time is large, so the thickness is preferably 300 µm or less, more preferably 150 µm or less.

Shape of Insert Material

The shape of the insert material is not particularly limited. There is no problem so long as when the insert material melts and is pushed out from the joining surfaces, it passes over the entire joining surfaces. This is because if there is even a part where the insert material does not pass, the oxides at that part are liable not to be removed. For this reason, from the viewpoint of raising the effect of discharge of oxides on the joining surfaces of the metal members, it is preferably made a size able to cover at least one of the joining surfaces. This is because due to this, it is possible for the insert material to fill the space between the joining surfaces as a whole and possible for the oxides on the joining surfaces to be reliably discharged. The above findings can also be applied to metals other than steel. It was confirmed that if based on the melting point, the numerical ranges become generally the same. As metals other than steel, alloys of mainly Al, Ti, Cu, etc. may be mentioned.

EXAMPLES

In experiments, a steel material was used as the metal member. The steel material and insert material used in the experiments were as follows.

Steel material: Fe-0.45% C-0.2% Si-0.7% Mn
  Melting point: about 1440° C.
  Diameter 20 mm×length 100 mm columnar shape
  The two end faces are finished to flat surfaces by machining Insert material: Cu-35% Zn alloy
  Melting point: 930° C.
  Diameter 22 mm×thickness 100 µm (0.1 mm) disk shape Two of the steel materials were prepared. One was set coaxially at the fixed chuck, while the other was set to the rotating chuck. The chucks were moved in the axial direction and the insert material was set to be clamped by the two steel materials (see FIG. 1(a)). After that, the rotating chuck was rotated and the chucks were made to move so that the two steel materials were pressed (see FIG. 1(b)). The rotational speed at that time was made a constant 1800 rpm, the friction pressure was 200 MPa, the friction time was 3 s ("s" indicates seconds. same below), the upset pressure was 300 MPa, and the upset time period was 3 s for the joining method.

The joining operation as evaluated by using the joined member (steel material comprised of two steel materials joined together to form single member) to conduct a tensile test and using the ratio of fracture strength (fracture strength/strength of base material) and the fracture site. Further, in the comparative examples, the same steel materials were used and conventional frictional pressure welding was performed without inserting an insert material. In Comparative Example 1, the friction time was made 2 s, while in Comparative Example 2, the friction time was made 3 s. The rest of the conditions were made the same conditions as the case of inserting the insert material. The test results are shown in Table 1.

TABLE 1

| | Presence of insert material | Joining time (pressure welding temperature) | Fracture strength ratio | Fractured part |
|---|---|---|---|---|
| Example | Yes | 3 s (990° C.) | 1.01 | Base material |
| Comp. Ex. 1 | No | 3 s (1300° C.) | 0.95 | HAZ part (about 3 mm from joint interface) |
| Comp. Ex. 2 | No | 2 s (900° C.) | 0.85 | Joint interface |

The invention example and Comparative Example 1 fracture at other than the joint interfaces, so the joints themselves appear to be good.

Further, the hardness profiles of the joints were measured. As a result, in the invention example, the distance from the joint interface to the softest part of the HAZ was about 1.5 mm, while in Comparative Example 1, it was about 3 mm. That is, it could be confirmed that the HAZ width in the invention example became narrower.

Considered from the fracture strength ratios of the invention example and Comparative Example 1, the fracture strength ratio of Comparative Example 1 is 0.95. Again it appears that high temperature heating has an effect, though slight. From, this, it could be confirmed that the joined member obtained by friction welding according to the present invention has a joint strength equal to that of the past regardless of the joining being performed at a relatively low temperature and that the HAZ width becomes narrower.

Comparative Example 2 fractured at the joint interface, so it seems the joint itself was not sufficient. As the reasons, it may be considered that the joining time was short and the temperature low, so the plastic flow was not sufficient and oxides remained at the joining surfaces or the bondability was poor and the joint was cooled while the solid phase joining was still insufficient. The outer circumference of the joined member was heated to 1000° C. or more, but the center part did not receive peripheral speed and heat of friction was not generated, so had to be heated by conduction of heat from the surroundings. That is, if the joining time is too short, the center part is not sufficiently joined, so it is believed that the joint strength falls. On the other hand, in the invention example, the insert material started to be discharged from a joining time of about 2 s. This means that the joint interface as a whole reached the melting point of the insert material or more. That is, by clamping the insert material, it is believed that the temperature of the joint interface easily rose at the center part compared with the previous methods.

From the above, it could be confirmed that by the friction welding according to the present invention, a quality of joining equal to or better than the past is obtained even at a temperature lower than the conventional method. Note that, needless to say, the embodiments of the friction welding method according to the present invention are not limited to the above-mentioned mode.

INDUSTRIAL APPLICABILITY

According to the present invention, even when joining together steel and other metal members, they can be joined at a low temperature and a quality of joining equal to or better than the past can be obtained. For this reason, the present invention can be utilized in the manufacture of precision machine parts etc.

REFERENCE SIGNS LIST 1 and 2. metal member
3. insert material

The invention claimed is:

1. A friction welding method of a pair of metal members comprising the following steps:
   clamping an insert material between surfaces of said metal members facing each other prior to friction welding and then starting said friction welding,
   wherein said insert material consists of a metal having a melting point (centigrade temperature) of 60 to 80% of the melting point (centigrade temperature) of said metal members,
   melting said insert material, and
   pushing the melted insert material out from between the pair of metal members during friction welding,
   wherein the temperature at the time of friction welding is higher than a melting point (centigrade temperature) of said insert material by 50° C. or more; and
   wherein the insert material is a Cu-, Fe-, Ni-, or Au-based alloy, and further comprising at least one of Si, B, V, P, and Zn.

2. The friction welding method of metal members according to claim 1 wherein said insert material has a thickness of 10 to 500 μm.

3. The friction welding method of metal members according to claim 1 wherein said insert material covers at least one of said joining surfaces.

4. A friction welding method of a pair of metal members comprising the following steps:
   clamping an insert material between surfaces of said metal members facing each other prior to friction welding and then starting said friction welding,
   wherein said insert material consists of a metal having a melting point (centigrade temperature) of 60 to 80% of the melting point (centigrade temperature) of said metal members,
   melting said insert material, and
   pushing the melted insert material out from between the pair of metal members during friction welding,
   wherein the temperature at the time of friction welding is higher than a melting point (centigrade temperature) of said insert material by 50° C. or more, and
   wherein none of said insert material remains between said metal members after friction welding.

5. The friction welding method of metal members according to claim 1 wherein said metal members are steel.

6. The friction welding method of metal members according to claim 2 wherein said insert material covers at least one of said joining surfaces.

7. The friction welding method of metal members according to claim 2 wherein none of said insert material remains between said metal members after friction welding.

8. The friction welding method of metal members according to claim 3 wherein none of said insert material remains between said metal members after friction welding.

9. The friction welding method of metal members according to claim 2 wherein said metal members are steel.

10. The friction welding method of metal members according to claim 3 wherein said metal members are steel.

11. The friction welding method of metal members according to claim 1, wherein none of said insert material remains between said metal members after friction welding, and wherein said metal members are steel.

12. The friction welding method of metal members according to claim 4, wherein said insert material has a thickness of 10 to 500 μm.

13. The friction welding method of metal members according to claim 4, wherein said insert material covers at least one of said joining surfaces.

14. The friction welding method of metal members according to claim 4, wherein said metal members are steel.

15. The friction welding method of metal members according to claim 12, wherein said insert material covers at least one of said joining surfaces.

16. The friction welding method of metal members according to claim 12, wherein said metal members are steel.

17. The friction welding method of metal members according to claim 13, wherein said metal members are steel.

18. The friction welding method of metal members according to claim 15, wherein said metal members are steel.

\* \* \* \* \*